United States Patent
Breeze-Stringfellow et al.

(10) Patent No.: US 11,262,144 B2
(45) Date of Patent: Mar. 1, 2022

(54) DIFFUSER INTEGRATED HEAT EXCHANGER

(71) Applicant: General Electric Company, Schenectady, NY (US)

(72) Inventors: Andrew Breeze-Stringfellow, Montgomery, OH (US); Daniel Lawrence Tweedt, West Chester, OH (US); Tsuguji Nakano, West Chester, OH (US); Syed Arif Khalid, West Chester, OH (US)

(73) Assignee: General Electric Company, Schenectady, NY (US)

( * ) Notice: Subject to any disclaimer, the term of this patent is extended or adjusted under 35 U.S.C. 154(b) by 246 days.

(21) Appl. No.: 15/858,453

(22) Filed: Dec. 29, 2017

(65) Prior Publication Data

US 2019/0204010 A1 Jul. 4, 2019

(51) Int. Cl.
*F28F 13/08* (2006.01)
*F28D 21/00* (2006.01)
(Continued)

(52) U.S. Cl.
CPC ............... *F28F 13/08* (2013.01); *F02C 7/14* (2013.01); *F05D 2260/213* (2013.01);
(Continued)

(58) Field of Classification Search
CPC .. F02C 7/141; F02C 7/143; F02C 7/14; F02C 7/18; F02C 7/224; F05D 2260/204; F05D 2260/205; F05D 2260/207; F05D 2260/208; F05D 2260/211; F05D 2260/213; F05D 2260/2214; F05D 2260/22141; F28F 13/08; F28F 1/22; F28F 2215/04; F28F 2215/06; F28F 2250/02; F28F 2250/102; F28F 2250/104; F28F 1/025; F28F 9/0212; F28F 9/0231; F28F 9/0263; F28F 9/0265; F28F 9/0268; F28F 9/0282; F28F 2009/029; F28D 2021/0026; F28D 7/005; F28D 7/0058; F28D 7/0041; F28D 7/10;
(Continued)

(56) References Cited

U.S. PATENT DOCUMENTS 2,485,088 A 10/1949 Ellis
3,507,324 A 4/1970 Mueller
(Continued)

FOREIGN PATENT DOCUMENTS

CN 104471342 3/2015
JP 57192798 A * 11/1982 .............. F28F 13/08

*Primary Examiner* — Stephanie Sebasco Cheng
(74) *Attorney, Agent, or Firm* — Dority & Manning, P.A.

(57) ABSTRACT

A heat exchanger apparatus includes: spaced-apart peripheral walls extending between an inlet and an outlet, the peripheral walls collectively defining a flow channel which includes a diverging portion downstream of the inlet, in which a flow area is greater than a flow area at the inlet; a plurality of spaced-apart fins disposed in the flow channel, each of the fins having opposed side walls extending between an upstream leading edge and a downstream trailing edge, wherein the fins divide at least the diverging portion of the flow channel into a plurality of side-by-side flow passages; and a heat transfer structure disposed within at least one of the fins.

21 Claims, 6 Drawing Sheets

(51) Int. Cl.
*F02C 7/12* (2006.01)
*F02C 7/14* (2006.01)
*F28D 7/00* (2006.01)
*F28F 1/22* (2006.01)
*F28D 7/10* (2006.01)

(52) U.S. Cl.
CPC .... *F05D 2260/22141* (2013.01); *F28D 7/005* (2013.01); *F28D 7/10* (2013.01); *F28D 2021/0026* (2013.01); *F28F 1/22* (2013.01); *F28F 2250/02* (2013.01)

(58) Field of Classification Search
CPC ...... F28D 7/1692; F28D 1/0233; F28D 1/024; F28D 1/0246; F28D 1/0316; F28D 1/0478; F28D 2007/0266; F28D 2007/0273; F28D 2021/0021
USPC ....................................................... 165/147
See application file for complete search history.

(56) References Cited

U.S. PATENT DOCUMENTS

| | | | |
|---|---|---|---|
| 4,059,882 A | | 11/1977 | Wunder |
| 5,269,133 A | * | 12/1993 | Wallace ................. F02C 7/185 60/204 |
| 5,269,135 A | | 12/1993 | Vermejan et al. |
| 5,737,915 A | * | 4/1998 | Lin ........................... F23R 3/04 60/751 |
| 8,397,487 B2 | | 3/2013 | Sennoun et al. |
| 8,763,363 B2 | | 7/2014 | Ranganathan |
| 9,766,019 B2 | | 9/2017 | Eleftheriou et al. |
| 9,771,867 B2 | * | 9/2017 | Karam .................... F02C 7/224 |
| 10,450,956 B2 | * | 10/2019 | Schmitz .................. B23P 15/26 |
| 2011/0287706 A1 | | 11/2011 | Maughan |
| 2012/0291993 A1 | | 11/2012 | Concialdi et al. |
| 2015/0240722 A1 | | 8/2015 | Loebig et al. |
| 2015/0330718 A1 | | 11/2015 | St. Rock et al. |
| 2016/0108814 A1 | | 4/2016 | Schmitz |
| 2016/0305324 A1 | | 10/2016 | Magowan |
| 2017/0226959 A1 | | 8/2017 | Julien et al. |
| 2019/0120562 A1 | * | 4/2019 | Fuller ................... F28F 9/0275 |

* cited by examiner

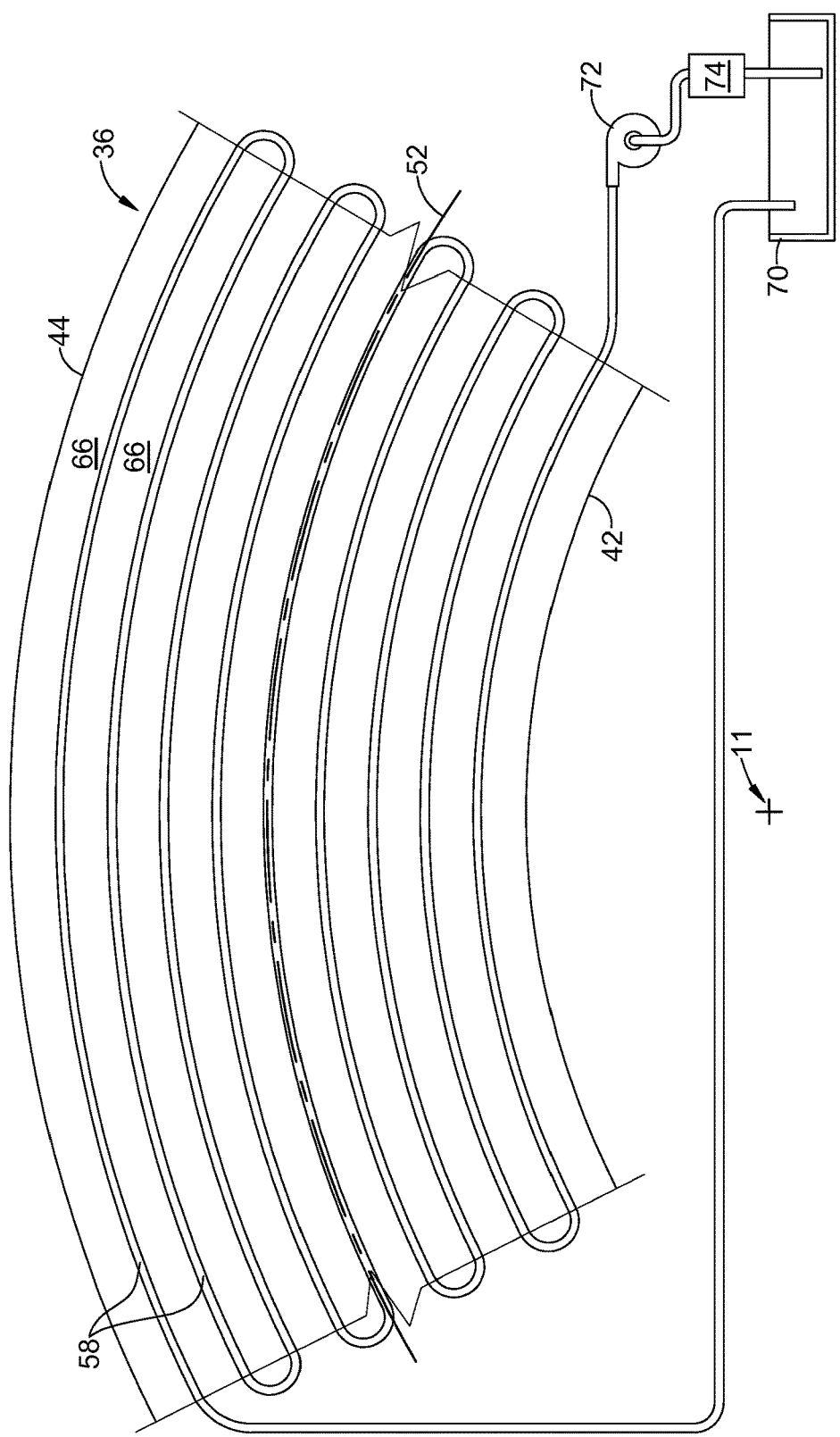

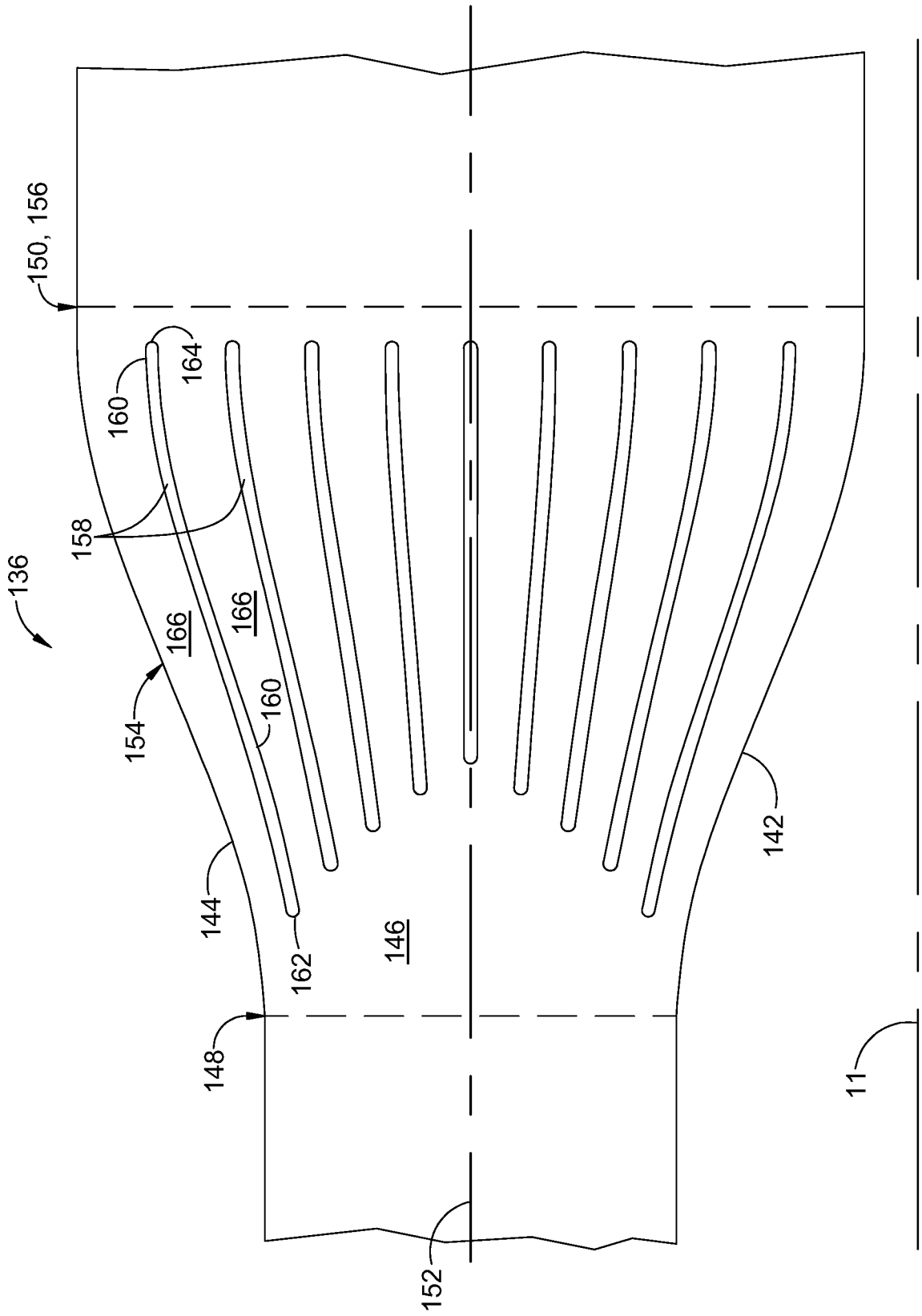

DIFFUSER INTEGRATED HEAT EXCHANGER

BACKGROUND OF THE INVENTION

This invention relates generally to gas turbine engines and methods for heat transfer in such engines.

There are numerous situations in which it would be desirable to introduce a heat exchanger into the primary flowpath of a gas turbine engine, or to another type of machinery that includes a high-velocity gas flowpath.

For example, heat exchangers may be used for purposes such as intercooling, waste heat recovery, anti-icing/de-icing, improving cycle thermal efficiency or operability, or thermal management.

One problem with introducing a heat exchanger into a gas turbine engine flowpath is that high velocities within the heat exchanger generate high pressure losses. If pressure losses are sufficiently high, they can exceed system efficiency gains provided by the heat exchanger, resulting in a net reduction in system efficiency.

In the prior art, it has been proposed to position a heat exchanger in a flowpath of a gas turbine engine, with a diffuser positioned upstream of the heat exchanger to reduce flow velocities and avoid pressure losses. However, a problem with this type of design is that it substantially increases the overall length of the heat exchanger system, making it difficult to incorporate into a compact engine design.

BRIEF DESCRIPTION OF THE INVENTION

At least one of these problems is addressed by a heat exchanger apparatus having a diffuser integral thereto.

According to one aspect of the technology described herein, a heat exchanger apparatus includes: spaced-apart peripheral walls extending between an inlet and an outlet, the peripheral walls collectively defining a flow channel which includes a diverging portion downstream of the inlet, in which a flow area is greater than a flow area at the inlet; a plurality of spaced-apart fins disposed in the flow channel, each of the fins having opposed side walls extending between an upstream leading edge and a downstream trailing edge, wherein the fins divide at least the diverging portion of the flow channel into a plurality of side-by-side flow passages; and a heat transfer structure disposed within at least one of the fins.

According to another aspect of the technology described herein, a heat exchanger apparatus includes: spaced-apart peripheral walls extending between an inlet and an outlet, the peripheral walls collectively defining a flow channel which includes a diverging portion downstream of the inlet, wherein the peripheral walls define a belly downstream of the inlet at which a flow area of the flow channel is at a maximum, and wherein the flow channel includes a converging portion downstream of the diverging portion; a plurality of spaced-apart fins disposed in the flow channel, each of the fins having opposed side walls extending between an upstream leading edge and a downstream trailing edge, wherein the fins divide at least the diverging portion of the flow channel into a plurality of side-by-side flow passages; wherein the peripheral walls and the fins are configured such that a total open flow area between the peripheral walls continuously increases from the inlet to the belly; and a heat transfer structure disposed within at least one of the fins.

According to another aspect of the technology described herein, a gas turbine engine includes: a compressor, a combustor, and a turbine arranged in sequential flow relationship and; a flowpath disposed in fluid communication with at least one of the compressor, the combustor, and the turbine; and a heat exchanger apparatus, including: spaced-apart peripheral walls extending between an inlet and an outlet, the peripheral walls collectively defining a flow channel disposed in fluid communication with the flowpath, wherein the flow channel includes a diverging portion downstream of the inlet, in which a flow area is greater than a flow area at the inlet; a plurality of spaced-apart fins disposed in the flow channel, each of the fins having opposed side walls extending between an upstream leading edge and a downstream trailing edge, wherein the fins divide the flow channel into a plurality of side-by-side flow passages; and a heat transfer structure disposed within at least one of the fins.

BRIEF DESCRIPTION OF THE DRAWINGS

The invention may be best understood by reference to the following description taken in conjunction with the accompanying drawing figures in which:

FIG. 3 is a view taken along lines 3-3 of the heat exchanger of FIG. 2;

FIG. 4 is a partially sectioned view of a portion of a fin of the heat exchanger of FIG. 3;

FIG. 5 is a schematic cross-sectional view of an alternative heat exchanger suitable for inclusion in the engine of FIG. 1;

DETAILED DESCRIPTION OF THE INVENTION

Figure 1:
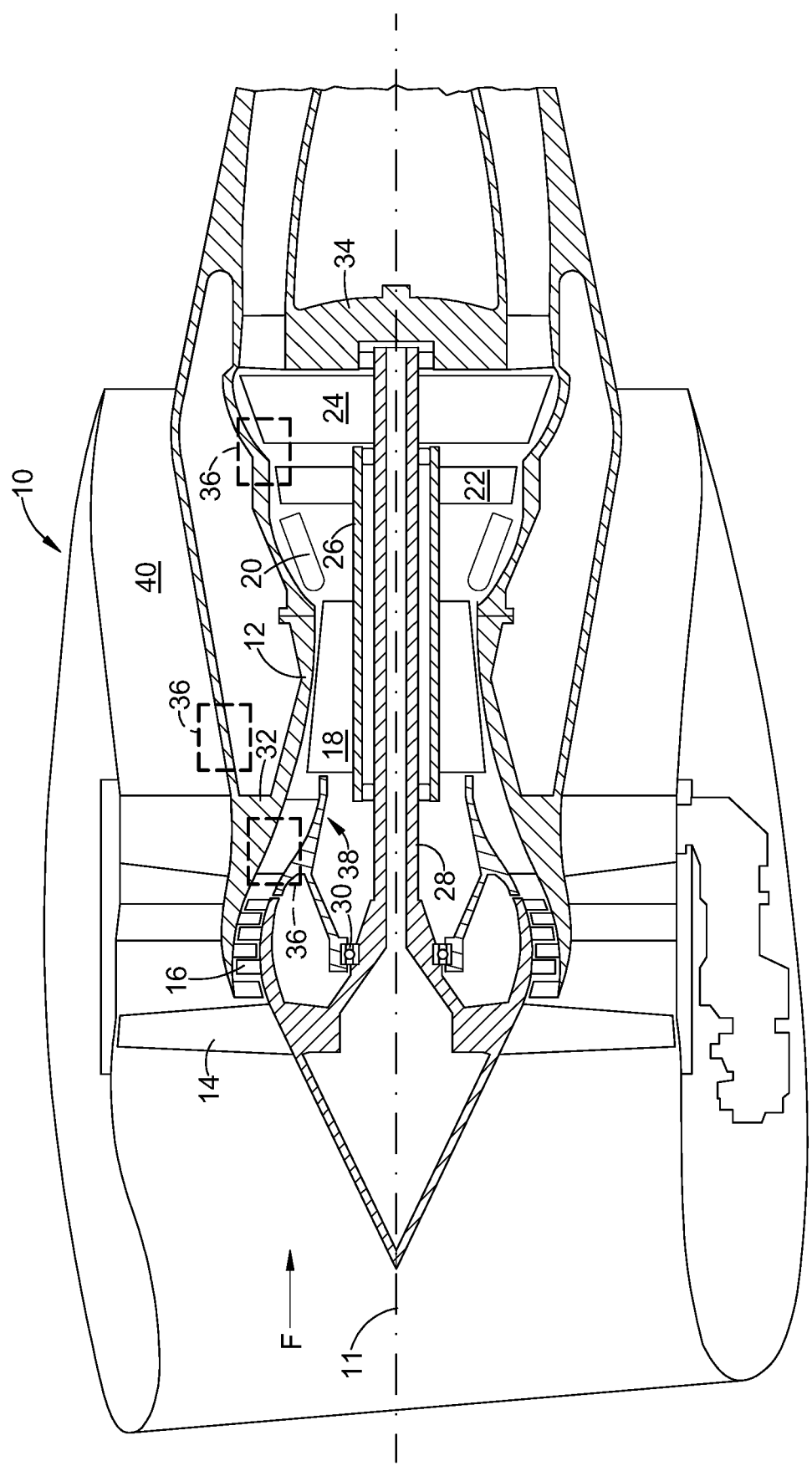
FIG. 1 is a schematic cross-sectional view of a gas turbine engine incorporating an exemplary heat exchanger.

Referring to the drawings wherein identical reference numerals denote the same elements throughout the various views, FIG. 1 depicts a gas turbine engine 10 incorporating a heat exchanger constructed according to an aspect of the technology described herein. While the illustrated example is a high-bypass turbofan engine, the principles of the present invention are also applicable to other types of engines, such as low-bypass turbofans, turbojets, stationary gas turbines, or engines or flowpaths in land or sea vehicles, etc. Several of the components of the engine 10 are illustrated in schematic block diagram form. The engine 10 has a longitudinal centerline axis 11 and an outer stationary annular casing 12 disposed concentrically about and coaxially along the centerline axis 11. The engine 10 has a fan 14, booster 16, high-pressure compressor 18, combustor 20, high pressure turbine 22, and low-pressure turbine 24 arranged in serial flow relationship. In operation, pressurized air from the high-pressure compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 14 and booster 16 via an inner shaft 28. The inner and outer shafts 28 and 26 are rotatably mounted in bearings 30 which are themselves mounted in a fan frame 32 and a turbine rear frame 34.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 incorporates one or more heat exchangers. Exemplary locations of heat exchangers are shown schematically by boxes labeled 36 in FIG. 1.

It will be understood that a heat exchanger typically includes structure inside of the primary flow duct such as fins or tubes. The introduction of this structure inevitably reduces flow area which causes the duct to act as a nozzle, increasing flow velocity. This is undesirable because pressure losses in a flowing fluid are proportional to the square of its velocity.

The heat exchangers described herein are particularly suitable for use with a flowpath that is intolerant to flow losses. While flow losses are always undesirable, the term "intolerant to flow losses" as used herein refers to a flowpath in which undesirable effects caused by flow losses would outweigh the desirable effects of the heat transfer. This would generally be a flowpath having a flow with a Mach number greater than about 0.3. Nonlimiting examples of such a flowpath would include: a heat exchanger 36 used as intercooler in a gooseneck duct 38 between the booster 16 and high-pressure compressor 18, a heat exchanger 36 communicating with the fan bypass duct 40 and using fan air to cool auxiliary components (not shown), or a heat exchanger 36 communicating with the low-pressure turbine 24 and used as a cooler or recuperator.

Figure 2:
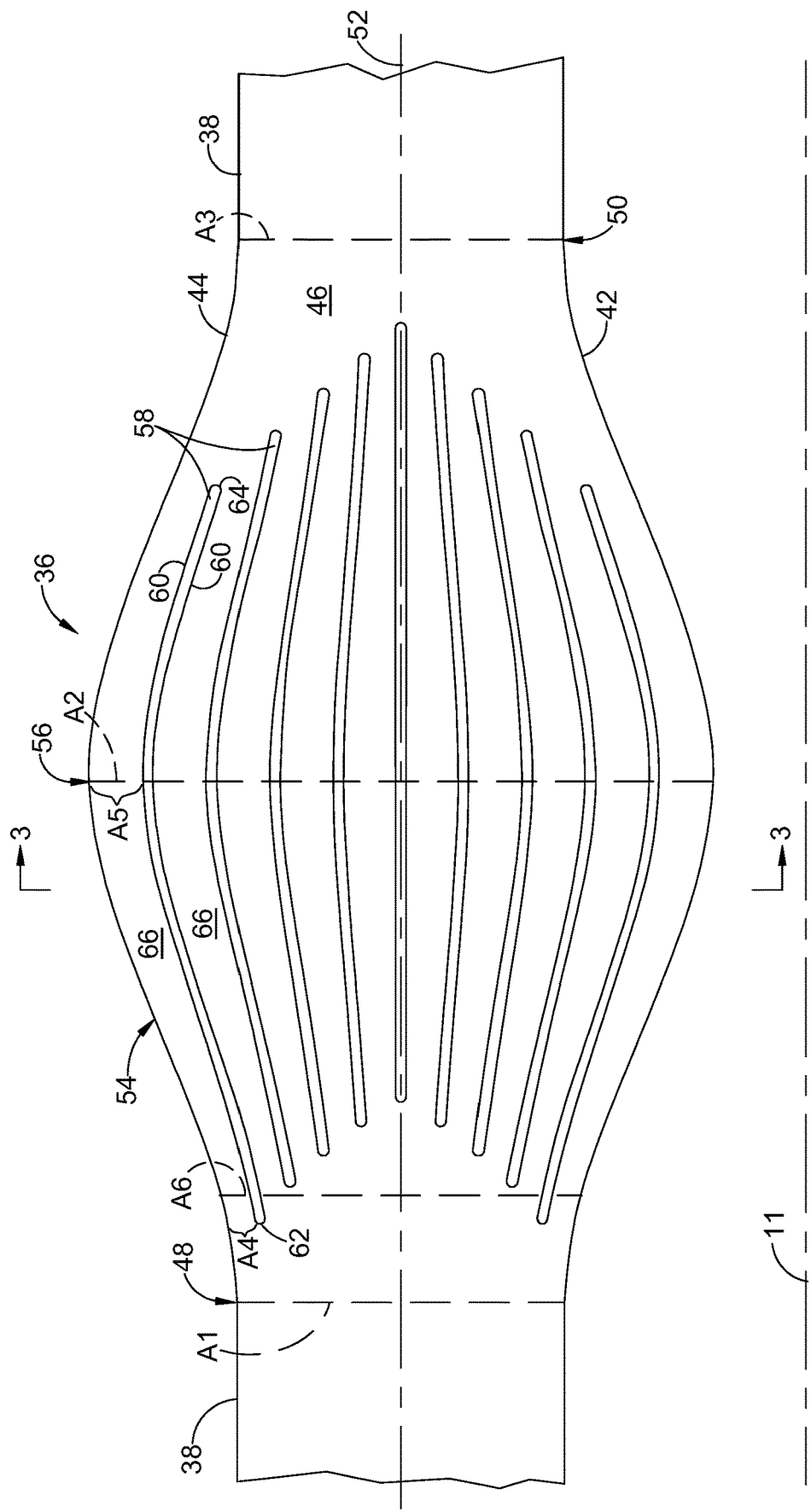
FIG. 2 is a schematic cross-sectional view of a heat exchanger suitable for inclusion in the engine of FIG. 1.

FIGS. 2 and 3 are schematic illustrations of the structure of a heat exchanger 36. The heat exchanger 36 includes a pair of spaced-apart inner and outer peripheral walls 42 and 44, respectively, which between them define a flow channel 46 for a first fluid. In one example, the first fluid may be a working fluid of the engine 10, such as air or combustion products. The flow channel 46 has an inlet 48 at an upstream end, and an outlet 50 at a downstream end.

As best seen in FIG. 3, the heat exchanger 36 may be configured as a partially or wholly arcuate body, formed by partial or complete revolution about an axis exterior to the peripheral walls 42,44, for example the centerline axis 11. A midline 52 represents an abstract surface that divides the flow-orthogonal area between the inner and outer peripheral walls 42 and 44 into two parts, which may have approximately equal flow areas. Alternatively, instead of having an arcuate shape, the heat exchanger 36 could extend laterally along a linear axis (e.g. an axis tangential to the centerline 11, or stated another way, out of the page in FIG. 3).

The flow channel 46 communicates with or forms part of a flowpath of the engine 10, which may a primary flowpath thereof. For example, the heat exchanger 36 may be integral to the gooseneck duct 38 interconnecting the booster 16 and the high-pressure compressor 18.

The heat exchanger 36 includes a diverging portion 54 downstream of the inlet 48. Within the diverging portion, the peripheral walls 42,44 diverge so that they are laterally farther from the midline 52 than they are at the inlet 48. Described another way, the peripheral walls 42, 44 bulge outwards. A location downstream of the inlet 48 where the peripheral walls 42, 44 reach their maximum dimension is referred to herein as a "belly" 56.

The flow channel 46 has a first flow area designated "A1" at the inlet 48. The flow channel 46 has a second flow area designated "A2" at the belly 56. The flow channel 46 has a third flow area designated "A3" at the outlet 50.

The second flow area A2 is greater than the first flow area A1, thus defining a diffuser. The ratio of the flow areas A2/A1 and the axial or streamwise rate of change between the two, that is, the profile shape of the peripheral walls 42, 44 ("diffusion rate"), may be selected to suit a specific application. As one example, the flow area A2/A1 may be selected to achieve a desired Mach number at the belly 56 given a specific inlet Mach number. For example, the Mach number at the inlet 48 might be approximately 0.5, and could be approximately for example about 0.2 at the belly 56. The flow area A2 at the belly 56 may be much greater than the flow area A1. In one example, the flow area A2 could be at least 30% greater than the flow area A1. In another example, the flow area A2 could be at least 50% greater than the flow area A1. In yet another example, the flow area A2 could be at least 100% greater than the flow area A1.

In the illustrated example, the third flow area A3 is less than the second flow area A2, thus defining a nozzle or converging portion. The ratio of the flow areas A3/A2 and the rate of change between the two, that is, the profile shape of the peripheral walls 42, 44, may be selected to suit a specific application. For example, if the Mach number at the inlet is approximately 0.5, is approximately for example about 0.2 at the belly 56, the nozzle could be configured to re-accelerate the flow to approximately Mach 0.5 at the outlet 50. As will be explained below relative to an alternative embodiment, the nozzle is desirable for certain applications, but is not required to achieve the functional benefit of the heat exchanger 36. Also, it is noted that a section of constant area (neither diffusing nor accelerating) may be positioned downstream of the belly 56).

A plurality of spaced-apart fins 58 are disposed in the flow channel 46. Each of the fins 58 has opposed side walls 60 extending between a leading edge 62 and a trailing edge 64. The fins 58 subdivide the flow channel 46 into a plurality of generally parallel flow passages 66.

Each of the flow passages 66 has a flow area at its upstream end, designated "A4", and a flow area at the belly 56, designated "A5". The outermost passage is shown in the example in FIG. 2. The fins 58 are configured such that each flow passage 66 acts as a diffuser, or stated another way the flow area A5 is greater than the flow area A4. Analysis has shown that it is beneficial for reducing flow losses if the flow passages 66 are configured so as to have similar or equal diffusion ratios, or stated another way, for the ratio A5/A4 to be approximately equal for each flow passage 66. It is also beneficial for reducing flow losses if the flow passages 66 are configured so as to have similar or equal diffusion rates as defined above.

The fins 58 are shaped and sized so as to act as turning vanes, that is to turn the flow of the first fluid in an axial-radial plane in a manner so as to prevent flow separation from the wall surfaces. The specific degree of flow turning will depend upon the shape of the mean line of the fins 58 and their angle of attack relative to the fluid flow.

Each of the fins 58 presents area blockage of the flow channel 46 equal to its frontal area. In order to mitigate the effect of the area blockage, the leading edges 62 of the fins 58 may be arranged in a staggered configuration. In the illustrated example, the leading edges 62 of the fins 58 adjacent the peripheral walls 42, 44 are positioned the most upstream or axially forward, with the leading edge 62 of each successive fin 58 proceeding towards the midline 52 being located downstream or axially aft from its outboard neighbor.

The staggered configuration may be arranged such that flow blockage of the fins 58 is introduced (considered from a flow point of view) at a rate similar to or less than the increase in flow area due to the divergence of the peripheral walls 42, 44.

For example, at the inlet 48, which is upstream of the leading edges 62 of the outermost fins 58, the flow area A1 is completely open (no fin blockage).

Downstream of the leading edges 62 of the outermost fins 58, another flow area A6 greater than the flow area A1 is defined between the peripheral walls 42, 44. at this downstream station, the flow channel 46 includes a blockage equivalent to the frontal area of the two most distal fins 58. The open flow area at station A6 is at least equal to the first flow area A1 plus the frontal area of the two most distal fins 58. A similar configuration is repeated at successive downstream locations to complete the staggered fin configuration. The illustrated stagger pattern is "V" shaped or chevron shaped, but other specific arrangements are possible.

The effect of the staggered fin location described above is that flow of the first fluid is always diffusing as it proceeds downstream from the inlet 48 to the belly 56.

In the illustrated example, the fins 58 are depicted as being arcuate, annular, or extending parallel to an axis. In essence, their shape variation is two-dimensional. It is physically possible to include fins which are oriented in a different direction than what is shown. For example, the fins could lie in an axial-radial plane. Alternatively, the fins could be oriented as shown but could additionally include stiffeners, supports, or dividers oriented in a different direction, such as an axial-radial plane. However, it will be understood that to achieve the maximum benefit of the concept described herein, the fins or other internal structure should be oriented generally parallel to the peripheral walls 42, 44 such that the diffuser effect can be maintained by manipulating the distance between the peripheral walls 42, 44 and the distance between the fins.

Optionally, structures such as waves, ripples, or ridges (not shown) along the exterior surfaces of the fins 58 could be included to create additional heat transfer surface area. If still more heat transfer surface area is required, secondary fins (not shown) running substantially perpendicular to the primary fin surfaces could be added to create passages with more heat transfer surface area.

Figure 6:
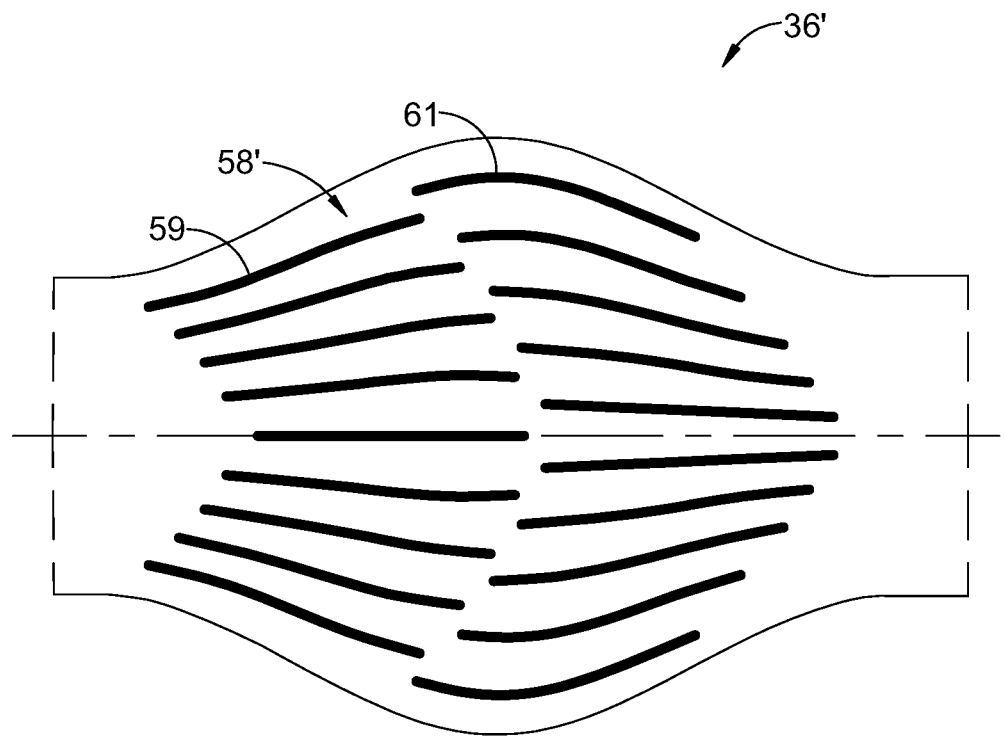
FIG. 6 is a schematic half-sectional view of another alternative heat exchanger having fins which are split into upstream and downstream portions.
Figure 7:
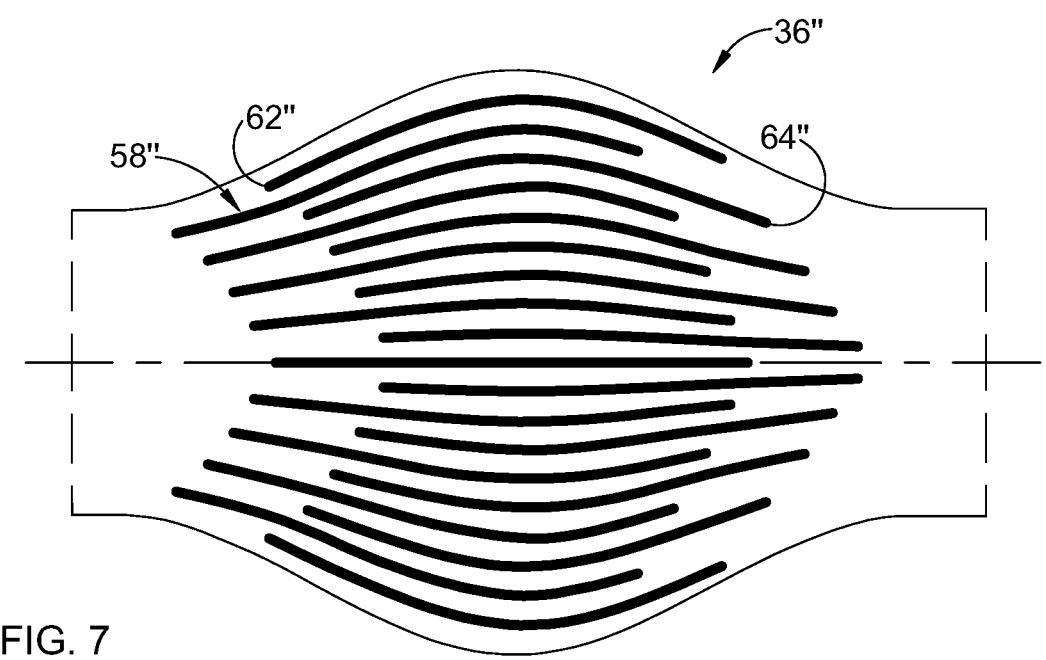
FIG. 7 is a schematic half-sectional view of another alternative heat exchanger having fins which are overlapped in a streamwise direction.

Other fin configurations are possible. For example, FIG. 6 illustrates a heat exchanger 36' having fins 58' which are split, each fin 58 having an upstream portion 59 and a separate downstream portion 61. As another example, FIG. 7 illustrates a heat exchanger 36" having fins 58" which are overlapped in the axial direction. The term "overlapped in the axial direction" in this context refers to a configuration in which alternate fins 58" are offset axially from in each in opposite directions, such that the middle portions of adjacent fins 58" are coextensive in the axial direction, and each fin 58" includes a forward portion extending axially forward of the leading edge 62" of the adjacent fin 58", or an aft portion extending axially aft of the trailing edge 64" of the adjacent fin 58".

The interior of at least one of the fins 58 includes a heat transfer structure. As used herein, the term "heat transfer structure" refers to a structure which functions to transfer heat energy from one area or region in contact with the heat transfer structure to another area or region which is also in contact with the heat transfer structure and which is spaced-away from the first area or region. Known heat transfer mechanisms include conduction, convection, and radiation. The heat transfer structure may use some or all of these heat transfer mechanisms.

In one example, the heat transfer structure may comprise a solid conduction element (not shown) disposed inside the fin 58 such as bars, rods, or plates having a high heat transfer coefficient. For example, a metal alloy such as copper or aluminum could be used for this purpose.

In another example, the heat transfer structure may comprise one or more heat pipes of a known type (not shown) disposed inside the fin 58.

In another example, the heat transfer structure may comprise one or more channels for conducting flow of a second fluid (e.g. oil, fuel or some other coolant). For example, FIG. 4 illustrates a small portion of a fin 58. The fin 58 incorporates a hollow inner passage 68 which can accommodate the flow of fluid. The inner passage 68 may be integral to the fin 58 or constructed as a separate component. It may take any of a number of shapes. FIG. 3 shows the fins 58 having the above-mentioned interior passages coupled to a circulating system which includes a reservoir 70, a pump 72, and appropriate interconnections such as pipes, manifolds, and/or valves to permit the circulation of the second fluid from the reservoir through the fins 58. The second fluid may be maintained at a desired temperature by various means. For example, the second fluid could be circulated through a remote heat exchanger 74 in order to cool it.

In operation, the first fluid flows through the flow channel 46 and over the fins 58. A second fluid circulates through the interior of the fins 58. For example, the second fluid may be a coolant supplied at a lower temperature than the first fluid. Depending upon the relative temperatures of the first and second fluids, heat is transferred either from the first fluid into the fins 58, then to the second fluid, or from the second fluid into the fins 58, then to the first fluid. As the first fluid flows from the inlet 48 to the belly 56, it diffuses, reducing its velocity and increasing its static pressure. The fins 58 act as turning vanes, as well as diffuser walls, allowing the first fluid to diffuse without separating from the peripheral walls 42, 44. As the first fluid passes downstream, is re-accelerated to an appropriate Mach number for the downstream flow-path. Analysis has shown that the heat exchanger 36 can achieve a pressure loss of less than 2% and a heat exchange rate equal to that of a prior art heat exchanger.

FIG. 5 illustrates an alternative heat exchanger 136, similar to the heat exchanger 36 described above. Elements of the heat exchanger 136 not specifically described may be taken to be identical to those of the heat exchanger 36 described above. The heat exchanger 136 includes a pair of spaced-apart inner and outer peripheral walls 142 and 144, respectively, which between them define a flow channel 146 for a first fluid. The flow channel 146 has an inlet 148 at an upstream end, and an outlet 150 at a downstream end. A midline 152 represents an abstract surface that divides the flow-orthogonal area between the inner and outer peripheral walls 142 and 144 into two parts, which may have approximately equal flow areas. In the illustrated example, the heat exchanger 136 is a partially or wholly arcuate body formed by partial or complete revolution about an axis, for example the centerline axis 11.

The flow channel 146 includes a diverging portion 154 downstream of the inlet 148. Within the diverging portion 154, the peripheral walls 142, 144 diverge so that they are laterally farther from the midline 152 then they are at the inlet 148. A location downstream of the inlet 148 where the peripheral walls reach their maximum dimension is referred to herein as a "belly" 156. In this embodiment, the belly 156 is coincident with the outlet 150.

A plurality of spaced-apart fins 158 are disposed in the flow channel 146. Each of the fins 158 has opposed side walls 160 extending between a leading edge 162 and a trailing edge 164. The fins 158 subdivide the flow channel 146 into a plurality of generally parallel flow passages 166.

The aerodynamic features of the heat exchanger 136, such as the equal diffusion ratios and/or rates of the flow passages 166, shaping of the fins 158 to act as turning vanes, and staggering of the fins 158, may be implemented as described for the heat exchanger 36 described above. The operation and functional advantages of the heat exchanger 136 are substantially the same as for the heat exchanger 36, with the exception that flow is not re-accelerated prior to the outlet 150.

Figure 8:
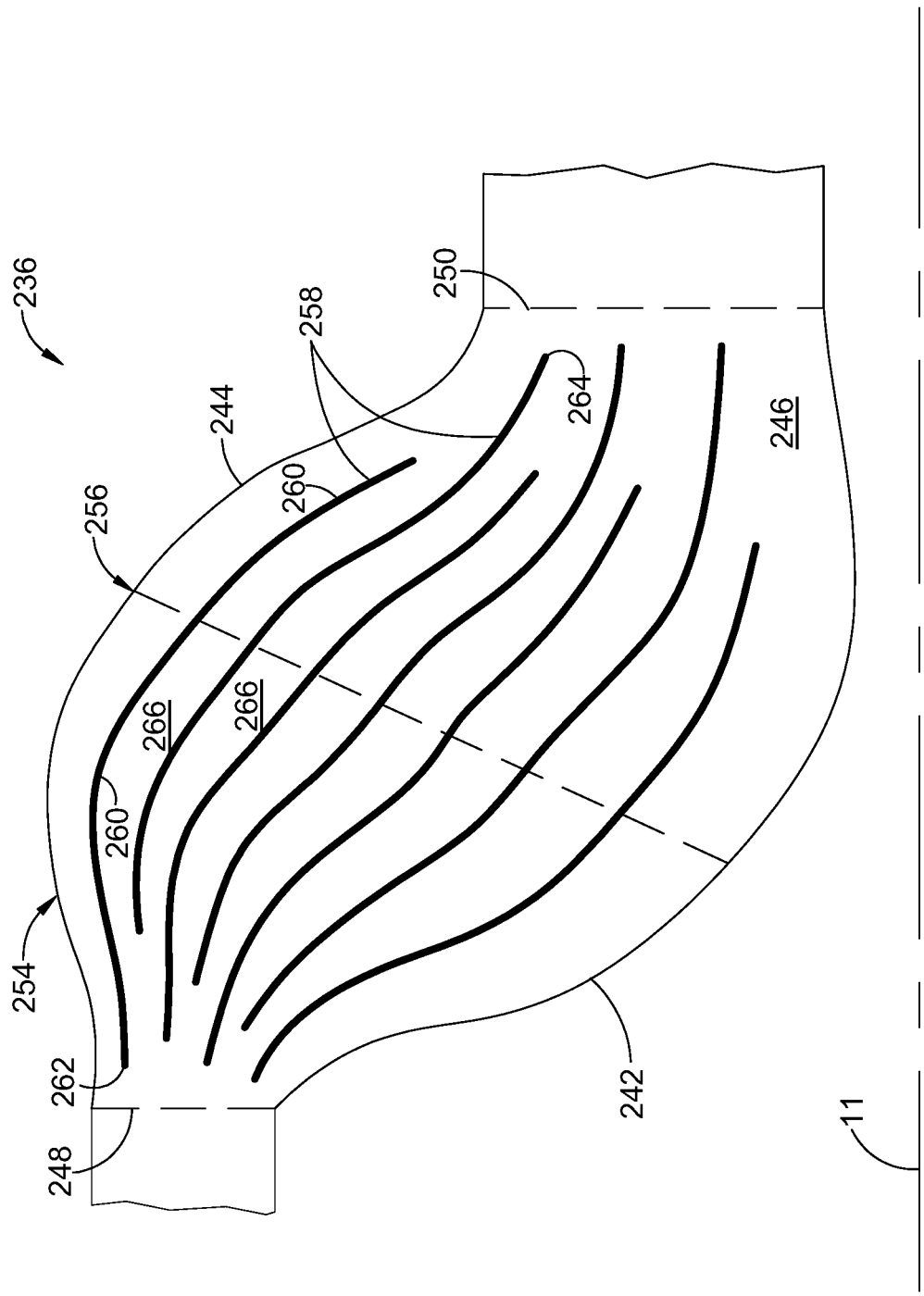
FIG. 8 is a schematic cross-sectional view of another alternative heat exchanger suitable for inclusion in the engine of FIG. 1.

FIG. 8 illustrates an alternative heat exchanger 236, similar to the heat exchanger 36 described above. Elements of the heat exchanger 236 not specifically described may be taken to be identical to those of the heat exchanger 36 described above. The heat exchanger 236 includes a pair of spaced-apart inner and outer peripheral walls 242 and 244, respectively, which between them define a flow channel 246 for a first fluid. The flow channel 246 has an inlet 248 at an upstream end, and an outlet 250 at a downstream end. In the illustrated example, the heat exchanger 236 is a partially or wholly arcuate body formed by partial or complete revolution about an axis, for example the centerline axis 11. A significant difference between the heat exchanger 236 and the heat exchanger 36 is that the heat exchanger 236 is not symmetrical about a midline.

The flow channel 246 includes a diverging portion 254 downstream of the inlet 248. Within the diverging portion 254, the peripheral walls 242, 244 diverge so that they are laterally farther apart from each other than they are at the inlet 248. A location downstream of the inlet 248 where the peripheral walls reach their maximum dimension is referred to herein as a "belly" 256. In the illustrated example, the peripheral walls 242, 244 reconverge downstream of the belly 256, thus defining a nozzle, but as noted above, this feature is optional.

A plurality of spaced-apart fins 258 are disposed in the flow channel 246. Each of the fins 258 has opposed side walls 260 extending between a leading edge 262 and a trailing edge 264. The fins 258 subdivide the flow channel 246 into a plurality of side-by-side flow passages 266.

The aerodynamic features of the heat exchanger 236, such as the equal diffusion ratios and/or rates of the flow passages 266, shaping of the fins 258 to act as turning vanes, and staggering of the fins 258, may be implemented as described for the heat exchanger 36 described above. The operation and functional advantages of the heat exchanger 236 are substantially the same as for the heat exchanger 36.

The apparatus described herein has several advantages over the prior art. In particular, it will achieve a given heat transfer with lower pressure loss and more compactness than prior art heat exchanger configurations. This is expected to enable the use of a heat exchanger in situations not previously considered suitable, such as in the primary flowpath of the gas turbine engine.

The foregoing has described a heat exchanger. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A heat exchanger apparatus, comprising:
spaced-apart peripheral walls extending from an inlet to an outlet;
a plurality of spaced-apart fins; and
a heat transfer structure,
wherein the inlet is defined axially forward of the outlet relative to a centerline axis,
wherein the peripheral walls collectively define a flow channel which includes a diverging portion downstream and axially aft of the inlet and a non-diverging portion downstream and axially aft of the diverging portion,
wherein the diverging portion has a flow area greater than a flow area at the inlet,
wherein the plurality of spaced-apart fins are disposed in the diverging portion of the flow channel,
wherein the plurality of spaced-apart fins extend downstream and axially aft beyond the diverging portion into the non-diverging portion,
wherein each of the plurality of spaced-apart fins has opposed side walls extending from an axially forward, upstream leading edge to an axially aft, downstream trailing edge,
wherein the plurality of spaced-apart fins divide at least the diverging portion of the flow channel into a plurality of side-by-side flow passages,
wherein the plurality of spaced-apart fins includes a first fin and a second fin adjacent to the first fin,
wherein the plurality of spaced-apart fins are alternatingly staggered such that the leading edge of the first fin extends axially forward of the leading edge of the second fin, and the trailing edge of the first fin extends axially forward of the trailing edge of the second fin, and
wherein the heat transfer structure is disposed within at least one of the plurality of spaced-apart fins.

2. The apparatus of claim 1, wherein a flow area of each of the flow passages increases in a downstream direction in the diverging portion.

3. The apparatus of claim 2, wherein the flow passages have equal diffusion ratios.

4. The apparatus of claim 1, wherein the leading edges of the plurality of spaced-apart fins are staggered such that a flow area blockage attributable to a combined frontal area of the plurality of spaced-apart fins is offset by a corresponding increase of flow area in the flow channel within the diverging portion.

5. The apparatus of claim 1, wherein:
the peripheral walls define a belly at a location downstream of the diverging portion, wherein the peripheral walls define a maximum flow area of the flow channel at the belly; and
the peripheral walls and the plurality of spaced-apart fins are configured such that a total open flow area between the peripheral walls continuously increases from the inlet to the belly.

6. The apparatus of claim 1, wherein the leading edges of the plurality of spaced-apart fins are staggered in a chevron pattern.

7. The apparatus of claim 1, wherein the plurality of spaced-apart fins are configured to turn a flow passing through the flow channel in at least one plane.

8. The apparatus of claim 1, wherein a maximum flow area of the flow channel is at least 30% greater than the flow area at the inlet.

9. The apparatus of claim 1, wherein the non-diverging portion of the flow channel includes a converging portion.

10. The apparatus of claim 1, wherein:
the peripheral walls define a belly at a location downstream of the diverging portion, wherein the peripheral walls reach their maximum dimension to define a maximum flow area of the flow channel at the belly.

11. The apparatus of claim 1, wherein the heat transfer structure includes a fluid flowpath.

12. The apparatus of claim 11, further comprising a fluid flow circuit communicating with the fluid flowpath.

13. The apparatus of claim 1, wherein the peripheral walls and the plurality of spaced-apart fins define a partial or complete body of revolution about the centerline axis, which is a predetermined axis positioned outside of the peripheral walls.

14. The apparatus of claim 1, wherein the plurality of spaced-apart fins are overlapped in a radial direction.

15. A heat exchanger apparatus, comprising:
spaced-apart peripheral walls extending from an inlet to an outlet,
a plurality of spaced-apart fins; and
a heat transfer structure,
wherein the inlet is defined axially forward of the outlet relative to a centerline axis,
wherein the peripheral walls collectively define a flow channel which includes a diverging portion downstream and axially aft of the inlet,
wherein the peripheral walls define a belly downstream of the diverging portion,
wherein a flow area of the flow channel is at a maximum at the belly,
wherein the flow channel includes a converging portion downstream and axially aft of the belly,
wherein the plurality of spaced-apart fins are disposed in the diverging portion of the flow channel,
wherein the plurality of spaced-apart fins extend downstream and axially aft beyond the diverging portion and into the belly,
wherein each of the plurality of spaced-apart fins has opposed side walls extending from an axially forward, upstream leading edge to an axially aft, downstream trailing edge,
wherein the plurality of spaced-apart fins divide at least the diverging portion of the flow channel into a plurality of side-by-side flow passages,
wherein the plurality of spaced-apart fins includes a first fin and a second fin adjacent to the first fin,
wherein the plurality of spaced-apart fins are alternatingly staggered such that the leading edge of the first fin extends axially forward of the leading edge of the second fin, and the trailing edge of the first fin extends axially forward of the trailing edge of the second fin,
wherein the peripheral walls and the plurality of spaced-apart fins are configured such that a total open flow area between the peripheral walls continuously increases from the inlet to the belly, and
wherein the heat transfer structure is disposed within at least one of the plurality of spaced-apart fins.

16. The apparatus of claim 15, wherein a flow area of each of the flow passages increases in a downstream direction in the diverging portion, and the flow passages have equal diffusion rates.

17. The apparatus of claim 16, wherein the leading edges of the plurality of spaced-apart fins are staggered such that a flow area blockage attributable to a combined frontal area of the plurality of spaced-apart fins is offset by a corresponding increase of flow area in the flow channel within the diverging portion.

18. The apparatus of claim 15, wherein the plurality of spaced-apart fins are configured to turn a flow passing through the flow channel in at least one plane.

19. A gas turbine engine, comprising:
a compressor, a combustor, and a turbine arranged in sequential flow relationship;
a flowpath disposed in fluid communication with at least one of the compressor, the combustor, and the turbine; and
a heat exchanger apparatus, including:
spaced-apart peripheral walls extending from an inlet to an outlet,
a plurality of spaced-apart fins, and
a heat transfer structure,
wherein the inlet is defined axially forward of the outlet relative to a centerline axis of the gas turbine engine,
wherein the peripheral walls collectively define a flow channel disposed in fluid communication with the flowpath,
wherein the flow channel includes a diverging portion downstream and axially aft of the inlet, in which a flow area is greater than a flow area at the inlet, and a non-diverging portion downstream and axially aft of the diverging portion,
wherein the plurality of spaced-apart fins are disposed in the diverging portion of the flow channel,
wherein the plurality of spaced-apart fins extend downstream and axially aft beyond the diverging portion into the non-diverging portion,
wherein each of the plurality of spaced-apart fins has opposed side walls extending from an axially forward, upstream leading edge to axially aft, downstream trailing edge,
wherein the plurality of spaced-apart fins divide at least the diverging portion of the flow channel into a plurality of side-by-side flow passages,
wherein the plurality of spaced-apart fins includes a first fin and a second fin adjacent to the first fin,
wherein the plurality of spaced-apart fins are alternatingly staggered such that the leading edge of the first fin extends axially forward of the leading edge of the second fin, and the trailing edge of the first fin extends axially forward of the trailing edge of the second fin, and wherein the heat transfer structure disposed within at least one of the plurality of spaced-apart fins.

20. The gas turbine engine of claim 19, wherein the flow channel defines a portion of a primary flowpath of the gas turbine engine.

21. The gas turbine engine of claim 19, wherein the peripheral walls and the plurality of spaced-apart fins define a partial or complete body of revolution about the centerline axis of the gas turbine engine.

\* \* \* \* \*